US012798323B2

(12) United States Patent
Taguchi et al.

(10) Patent No.: US 12,798,323 B2
(45) Date of Patent: Nov. 17, 2026

(54) VEHICLE

(71) Applicant: TOYOTA JIDOSHA KABUSHIKI KAISHA, Aichi (JP)

(72) Inventors: Daisei Taguchi, Nagoya (JP); Hiroyuki Okamoto, Miyoshi (JP); Sachi Fujinuma, Nagakute (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 347 days.

(21) Appl. No.: 18/627,444

(22) Filed: Apr. 5, 2024

(65) Prior Publication Data

US 2024/0336106 A1 Oct. 10, 2024

(30) Foreign Application Priority Data

Apr. 10, 2023 (JP) ................................ 2023-063493

(51) Int. Cl.
*B60H 1/00* (2006.01)

(52) U.S. Cl.
CPC ..... *B60H 1/00028* (2013.01); *B60H 1/00295* (2019.05)

(58) Field of Classification Search
CPC ........................ B60H 1/00028; B60H 1/00295
USPC ............................................................ 454/69
See application file for complete search history.

(56) References Cited

U.S. PATENT DOCUMENTS 6,544,116 B1 * 4/2003 Cerbo .................... B60H 1/248 62/235.1
8,480,166 B1 * 7/2013 Readwin ................ B60H 1/246 296/208
2012/0238197 A1 * 9/2012 Katagiri ............ B60H 1/00842 454/152

FOREIGN PATENT DOCUMENTS

JP H08-216661 A 8/1996
JP 2007-253884 A 10/2007

* cited by examiner

*Primary Examiner* — Vivek K Shirsat
(74) *Attorney, Agent, or Firm* — HAUPTMAN HAM, LLP

(57) ABSTRACT

Provided is a vehicle with a simpler structure capable of selectively blowing air for air conditioning to the vehicle interior from a desired location. The vehicle is a vehicle in which air for air conditioning is blown from an air outlet port of a first trim panel attached to a vehicle interior. The vehicle includes an air conditioner that generates the air; a pipe connected to the air conditioner and configured to divide the air discharged from the air conditioner into a plurality of flows; a blower fan removably attached to each end portion of the pipe and configured to blow the divided air to the air outlet port; and a cut-off member that blocks flow of the air in a portion where the blower fan is removed in a state where the blower fan is being detached from the pipe.

2 Claims, 8 Drawing Sheets

VEHICLE

CROSS REFERENCE TO RELATED APPLICATIONS

The present application claims priority from Japanese patent application JP 2023-063493 filed on Apr. 10, 2023, the entire content of which is hereby incorporated by reference into this application.

BACKGROUND

Technical Field

The present disclosure relates to a vehicle in which air is blown from air outlet ports of trim panels attached to the vehicle interior.

Background Art

As such a type of technique, JP 2007-253884 A, for example, discloses a vehicle including an air blower that blows air to the vehicle interior, seating sensors embedded in the seats in the vehicle interior, and a control unit that controls the number of rotation of a fan according to the occupied/unoccupied state in each seat detected by the seating sensor.

SUMMARY

By the way, in the vehicle disclosed in JP 2007-253884 A, air fed from the air blower is discharged into the vehicle interior through a plurality of air outlet ports, and the openings of the air outlet ports are controlled by the control of the control unit to select a position where the air is discharged in the vehicle interior. Thus, the vehicle may have a complicated device structure.

The present disclosure has been made in view of the foregoing, and provides a vehicle with a simpler structure capable of selectively blowing air for air conditioning to the vehicle interior from a desired location.

In view of the above issue, a vehicle according to the present disclosure is a vehicle in which air for air conditioning is blown from an air outlet port of a trim panel attached to a vehicle interior. The vehicle includes: an air conditioner configured to generate the air; a pipe connected to the air conditioner and configured to divide the air discharged from the air conditioner into a plurality of flows; a blower fan removably attached to each end portion of the pipe and configured to blow the divided air to the air outlet port; and a cut-off member configured to block flow of the air in a portion where the blower fan is removed in a state where the blower fan is being detached from the pipe.

According to the present disclosure, it is possible to divide the air for air conditioning discharged by the air conditioner in the pipe, allow the air for air conditioning to pass through each blower fan from each end portion of the pipe, and blow air from the air outlet port of the trim panel to the vehicle interior. In addition, it is possible to remove the blower fan corresponding to the air outlet port not required to blow air therefrom, and in the portion where the blower fan is removed, it is possible to block flow of the air by the cut-off member. In this way, it is possible to selectively blow air for air conditioning in the vehicle interior. Here, when blowing air for air conditioning discharged by the air conditioner is selected, the volume of the air to be blown varies. However, since the blower fan is attached to the end of the pipe, it is possible to blow air in the volume corresponding to the performance of the blower fan from each air outlet port to the vehicle interior.

In some embodiments, the blower fan is configured to be attached to the trim panel and to be detachable from a chassis together with the trim panel. According to this embodiment, the blower fan can be detached from the chassis integrally with the trim panel. Accordingly, since the positional relationship between the blower fan and the air outlet port of the trim panel is fixed, it is possible to reduce the work of regulating the air direction of the blower fan and the like.

In some embodiments, the pipe includes a plurality of portions, the plurality of portions including a portion connected to the blower fan, the portion connected to the blower fan being made of a flexible hose. According to this embodiment, since the portion of the pipe connected to the blower fan is a flexible hose, the blower fan can be easily detached from the chassis integrally with the trim panel.

In some embodiments, the trim panel includes a first trim panel having the air outlet port and a second trim panel not having the air outlet port, and the first trim panel and the second trim panel are configured to be selectively attached to the chassis depending on an application of the vehicle.

According to this embodiment, since the trim panel includes a first trim panel having an air outlet port and a second trim panel not having an air outlet port depending on the application, the first trim panel or the second trim panel may be selected and attached to the chassis depending on the application of the vehicle. In particular, since the first trim panel has a blower fan attached thereto, it is possible to blow air for air conditioning from the air outlet port of the first trim panel to a desired location.

According to the present disclosure, with a simpler structure, it is possible to selectively blow air for air conditioning to the vehicle interior from a desired location.

DETAILED DESCRIPTION

Hereinafter, a vehicle 1 according to an embodiment of the present disclosure will be described. As shown in FIG.

Figure 1A:
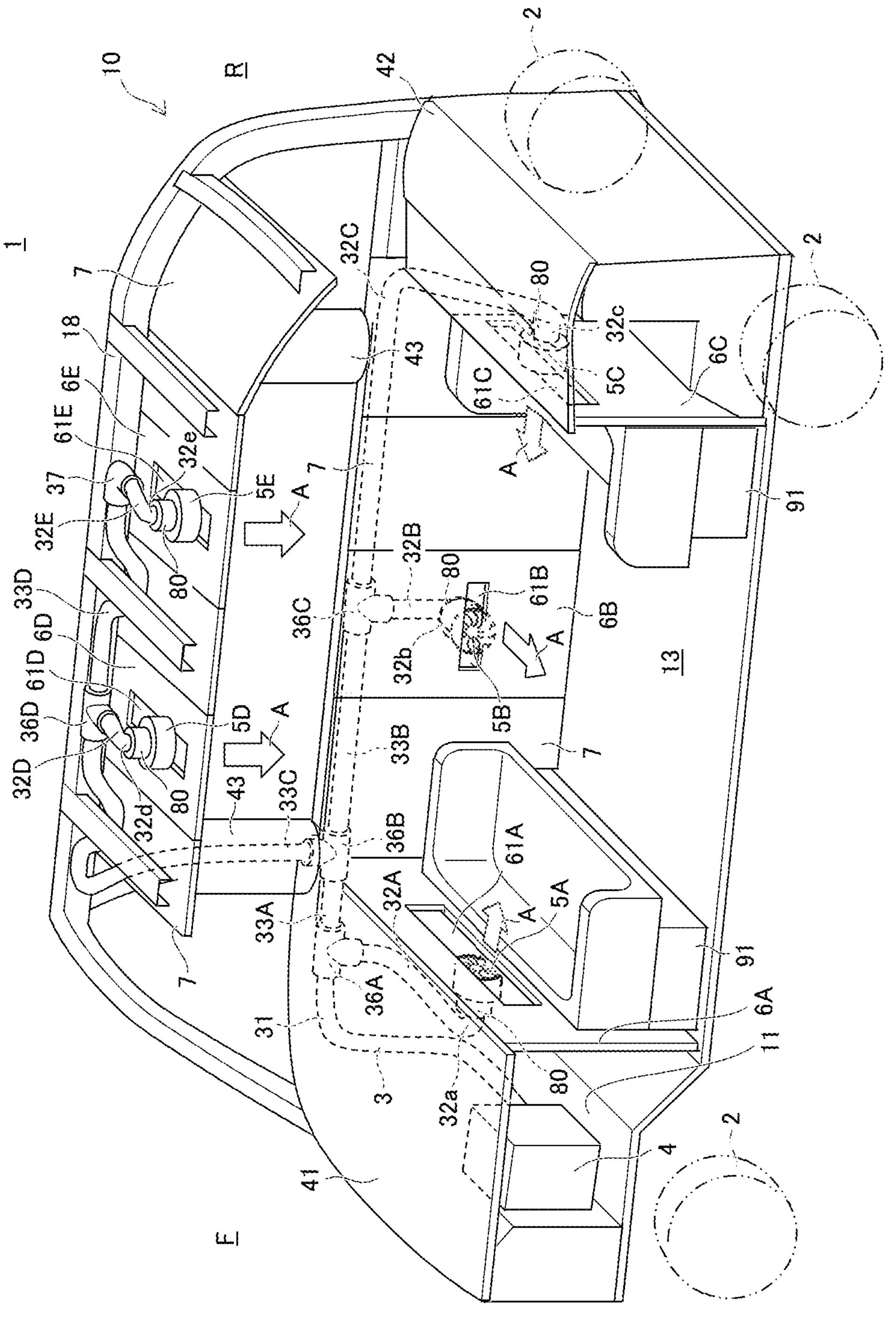
FIG. 1A is a schematic perspective view showing a first application of a vehicle according to the present embodiment.
Figure 1B:
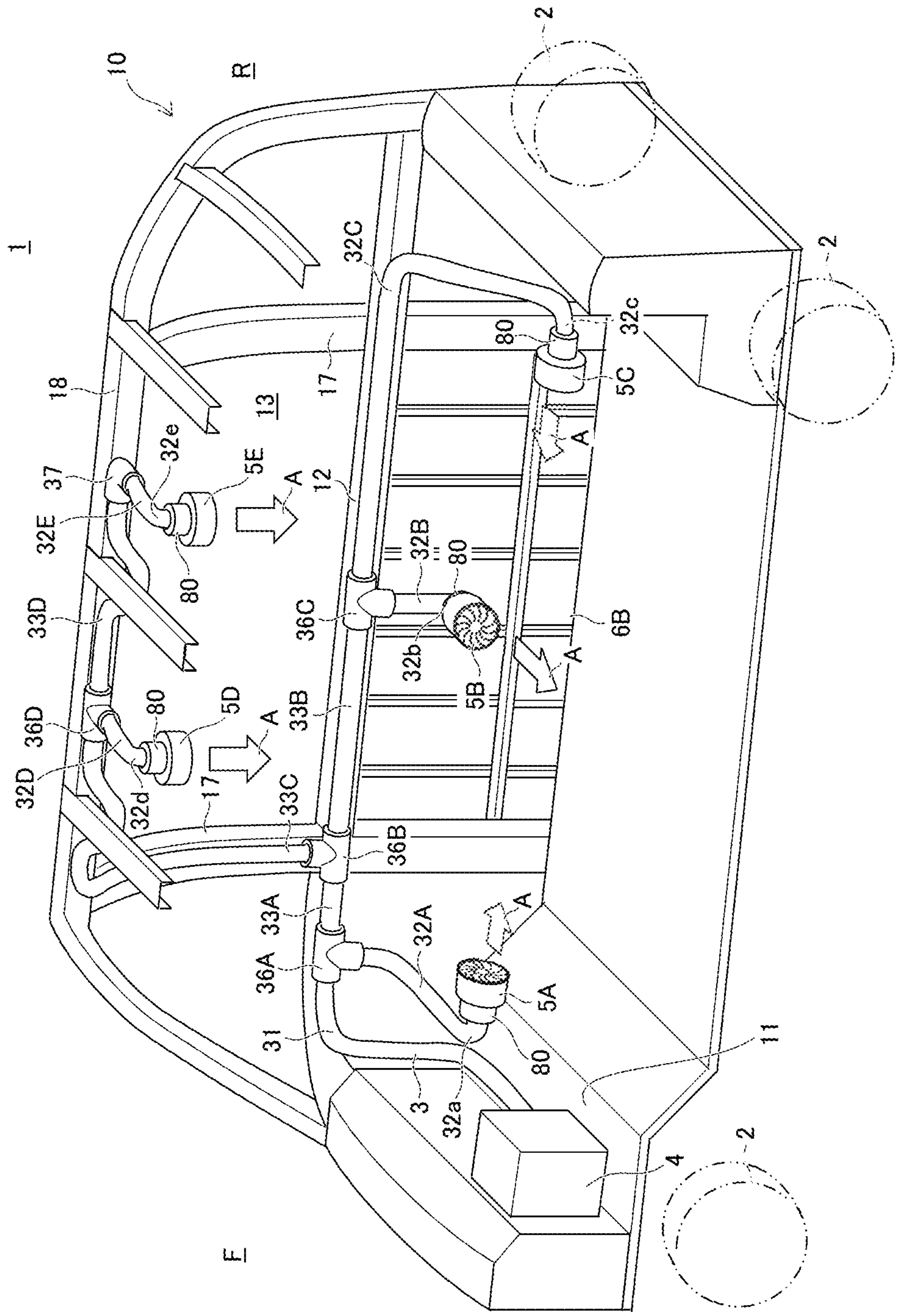
FIG. 1B is a schematic perspective view showing the position of a portion of a chassis, a pipe, and a blower fan of the vehicle in the first application in FIG. 1A.

1A and FIG. 1B, the vehicle 1 according to the present embodiment includes a drive unit (not shown) such as a motor driven by electric power from a power source (not shown), and a control unit (not shown) for controlling the drive unit. The vehicle 1 rotates the wheels 2 by the power of the drive unit and travels. Note that in FIG. 1A, FIG. 3A, and FIG. 4A, the structure on the front side of the drawings, such as doors of the vehicle 1, is omitted. Note that reference numeral F in the drawings indicates the front of the vehicle 1, and reference numeral R indicates the rear of the vehicle 1.

Figure 3A:
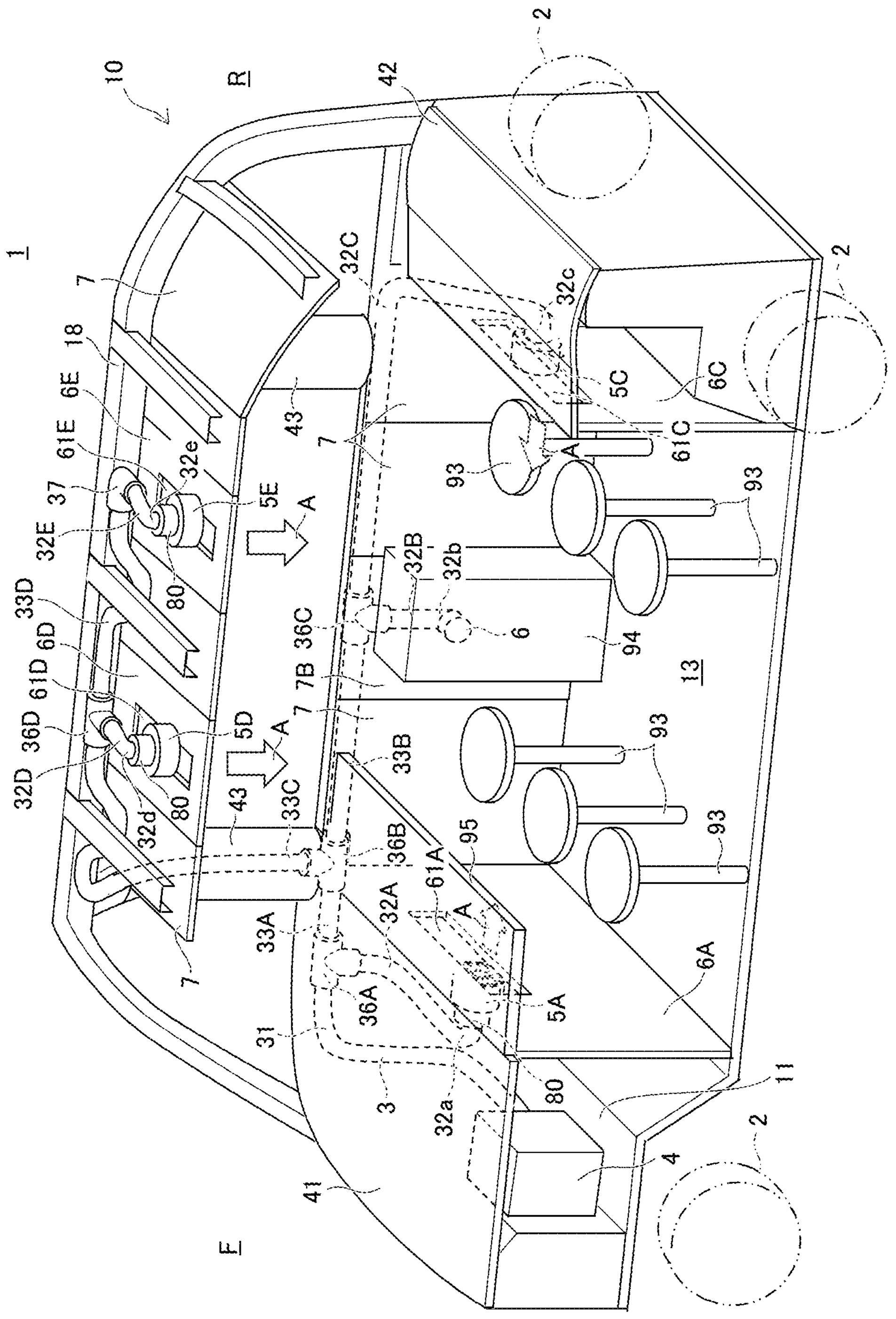
FIG. 3A is a schematic perspective view showing a second application of the vehicle according to the present embodiment.
Figure 4A:
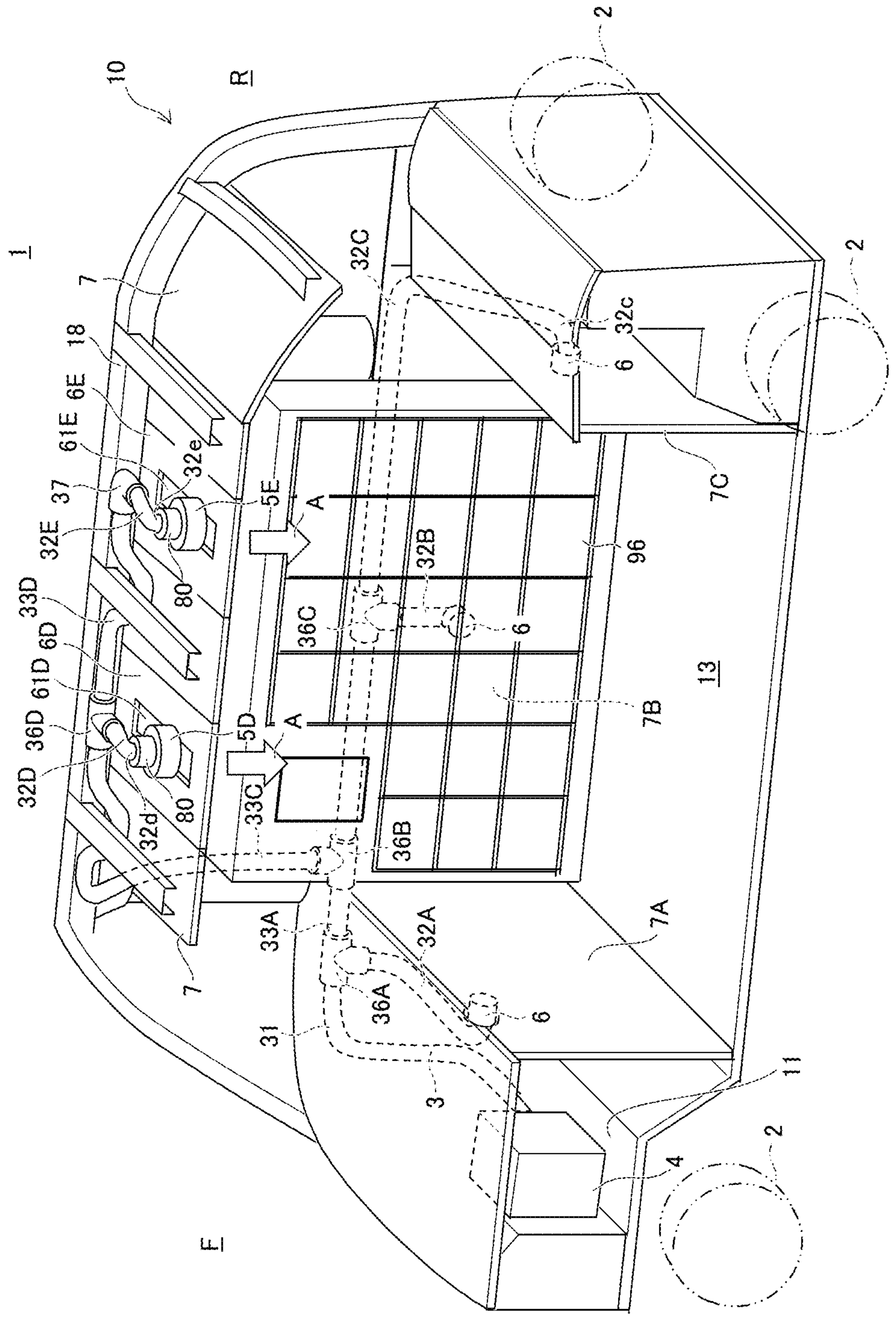
FIG. 4A is a schematic perspective view showing a third application of the vehicle according to the present embodiment.

In the present embodiment, the vehicle 1 is a vehicle in which air A is blown from air outlet ports 61A to 61E of a plurality of (in this embodiment, five) first trim panels 6A to 6E attached to a vehicle interior 13. As shown in FIG. 1A, FIG. 3A, and FIG. 4A, a combination of the first trim panels 6A to 6E as an interior material and blower fans 5A to 5E or a combination of second trim panels 7A to 7C as an interior material and a cut-off member 6 is selected according to the application of the vehicle 1. Note that other trim panels 7 may be interchangeable according to the application.

As shown in FIG. 1A, the vehicle 1 includes a chassis 10, on which the drive unit, the control unit, the power source (not shown), and the like are mounted as described above. Further, in the vehicle 1, an air conditioner 4, a pipe 3, the blower fans 5A to 5E, the first trim panels 6A to 6E, and the like are attached to the chassis 10.

The air conditioner 4 is a device that generates air for air conditioning by heating or cooling sucked outside air, and is started and stopped by the control unit. The configuration of the air conditioner 4 is similar to that of a commonly known air conditioner for vehicles. The air conditioner 4 adjusts the temperature of the air for air conditioning and also the flow rate (or the quantity of flow) of the adjusted air, and discharges the air into the pipe 3.

The pipe 3 is connected to the air conditioner 4 and divides the air A discharged from the air conditioner 4 into a plurality of flows to flow the air A. The pipe 3 includes a main pipe 31 and secondary pipes 32A to 32E, 33A to 33D.

The main pipe 31 is a pipe through which the air flowing from the air conditioner 4 flows, and is connected via flow dividing joints (T-type joints) 36A to 36D and the like. Each of the secondary pipes 32A to 32E, 33A to 33D allows the air divided by the flow dividing joints 36A to 36D to flow to each of the blower fans 5A to 5E. Note that the secondary pipes 32B, 32C, 32E may be further provided with, for example, an L-type joint 37 (a so-called elbow).

As shown in FIG. 1B, a portion of the pipe 3 runs from the air conditioner 4 through a floor plate 11 of the chassis 10 and is disposed along a side beam 12, and other portions of the pipe 3 are disposed along a ceiling-side side rail 18 from the side beam 12 via a pillar 17.

The main pipe 31 is connected to an input port of the flow dividing joint 36A fixed to the side beam 12. The front-side secondary pipe 32A is connected to one output port of the flow dividing joint 36A, and the secondary pipe 33A is connected to the other output port of the flow dividing joint 36A. The front-side secondary pipe 32A is connected to the front-side blower fan 5A via a coupler 80 (see FIG. 2A), which will be described later.

As shown in FIG. 1B, the secondary pipe 33A is disposed along the side beam 12 and is connected to an input port of the flow dividing joint 36B. The secondary pipe 33B is connected to one output port of the flow dividing joint 36B, and the secondary pipe 33C is connected to the other output port of the flow dividing joint 36B.

The secondary pipe 33B is disposed along the side beam 12 and is connected to an input port of the flow dividing joint 36C. The lateral-side secondary pipe 32B is connected to one output port of the flow dividing joint 36C, and the rear-side secondary pipe 32C is connected to the other output port of the flow dividing joint 36C. The lateral-side secondary pipe 32B hangs from the flow dividing joint 36C and is connected to the lateral-side blower fan 5B via the coupler 80. The rear-side secondary pipe 32C is connected to the rear-side blower fan 5C via the coupler 80.

On the other hand, the secondary pipe 33C connected to the flow dividing joint 36B is disposed along the pillar 17 extending in the vertical direction to the side rail 18, and is connected to an input port of the flow dividing joint 36D fixed to the side rail 18. The ceiling-front-side secondary pipe 32D is connected to one output port of the flow dividing joint 36D, and the secondary pipe 33D is connected to the other output port of the flow dividing joint 36D. The ceiling-front-side secondary pipe 32D is connected to the ceiling-front-side blower fan 5D via the coupler 80. The secondary pipe 33D extends rearward and is connected to the ceiling-rear-side secondary pipe 32E via the joint 37. The ceiling-rear-side secondary pipe 32E is connected to the ceiling-rear-side blower fan 5E via the coupler 80.

Here, the main pipe 31 and the secondary pipes 32A to 32E, 33A to 33D may be the pipes made of metal or resin. The main pipe 31 is fixed to the chassis 10 because it exists between the air conditioner 4 and the flow dividing joint 36A. The secondary pipes 33A to 33D are fixed to the chassis 10 via the joints such as the flow dividing joints 36A to 36D and the joint 37 because they exist between these joints. Therefore, from the viewpoint of durability and the like, the main pipe 31 and the secondary pipes 33A to 33D may be, for example, the pipes made of metal such as steel or aluminum, or may be the pipes made of non-flexible resin.

The secondary pipes 32A to 32E may be portions of the pipe directly connected to the blower fans 5A to 5E and may be made of a flexible hose. This can increase the workability for attaching and detaching the blower fans 5A to 5E to and from the secondary pipes 32A to 32E.

In such a flexible hose, a metal wire for reinforcement may be embedded in a flexible resin hose in a spiral shape. The main pipe 31 and the secondary pipes 33A to 33D may be made of a flexible hose like the secondary pipe 32B.

Figure 2A:
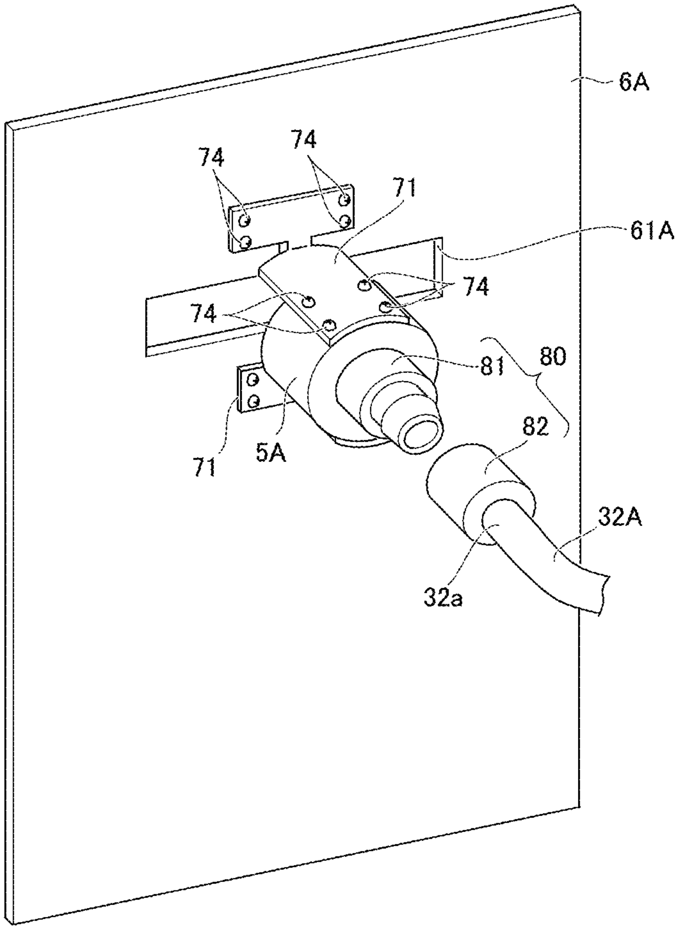
FIG. 2A is a schematic perspective view for explaining a method of attaching a first trim panel and a blower fan.

The blower fans 5A to 5E are removably attached to the end portions 32*a* to 32*e* of the secondary pipes 32A to 32E via the coupler 80. For example, as shown in FIG. 2A, the coupler 80 includes a socket 82 attached to the end portion 32*a* of the secondary pipe 32A from which the air is discharged, and a plug 81 attached to the suction section of each of the blower fans 5A to 5E from which the air is sucked. The coupler 80 may be a one-touch coupler, and is not particularly limited as long as it can couple the secondary pipes 32A to 32E and the blower fans 5A to 5E.

In this way, by coupling the socket 82 and the plug 81, the air A flowing to the end portion 32*a* of the secondary pipe 32A can be supplied to the blower fan 5A. The blower fan 5A can be easily detached from the secondary pipe 32A by releasing the coupling between the socket 82 and the plug 81. Although the connection structure between the blower fan 5A and the secondary pipe 32A has been described by referring to FIG. 2A, the connection structure between the blower fans 5B to 5E and their corresponding end portions 32*b* to 32*e* of the secondary pipes 32B to 32E is the same, and thus detailed description thereof will be omitted.

In the present embodiment, the blower fan 5A is attached to the first trim panel 6A and is detachable from the chassis 10 together with the first trim panel 6A. Specifically, the blower fan 5A is attached to the first trim panel 6A via brackets 71 by fasteners 74 such as screws. The blower fan 5A is connected to the power source via a wire or the like, and is a device configured to blow air A from the secondary pipe 32A to the vehicle interior 13. Since the blower fan 5A is a typical blower fan, detailed description of the fan main body and the structure of the fan main body and the drive motor and the like will be omitted. In addition, although the attachment structure of the blower fan 5A and the first trim panel 6A has been described by referring to FIG. 2A, the attachment structure of the blower fans 5B to 5E and the first trim panels 6B to 6E is the same, and thus detailed description thereof will be omitted.

Hereinafter, the first trim panel 6A and the second trim panel 7A will be described referring to FIG. 2A and FIG. 2B as an example. As shown in FIG. 2A, in the present embodiment, the front surface of the first trim panel 6A is a surface decorated for the interior or the like, and the rear surface of the first trim panel 6A includes a locking portion (not shown) that locks into a part of the chassis 10. By allowing the locking portion to lock into the chassis 10, the first trim panel 6A can be attached to the chassis 10.

In the first trim panel 6A, the air outlet port 61A penetrating therethrough in the thickness direction is formed. The blower fan 5A is attached to the first trim panel 6A via the brackets 71 such that the air from the blower fan 5A flows toward the air outlet port 61A. Note that the brackets 71 may be provided with an adjustment mechanism for adjusting the angle formed with respect to the normal direction of the rear surface of the first trim panel 6A for regulating the blowing direction of the blower fan 5A, or the air outlet port 61A may be provided with a louver for regulating the blowing direction.

As described above, in the present embodiment, the blower fan 5A is attached to the first trim panel 6A via the brackets 71 such that the air blowing portion of the blower fan 5A faces the air outlet port 61A. Further, the blower fan 5A is connected to the secondary pipe 32A via the coupler 80. By adopting such a structure, the blower fan 5A can be detached from the chassis 10 (specifically, the secondary pipe 32A) integrally with the first trim panel 6A.

Figure 2B:
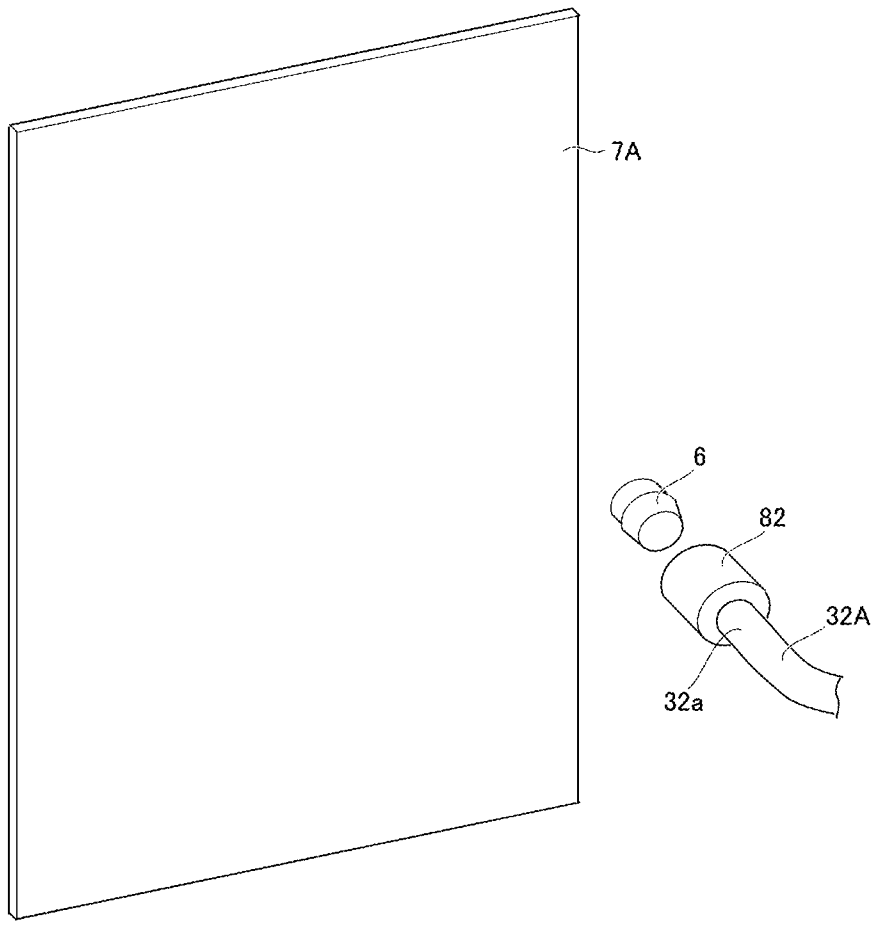
FIG. 2B is a schematic perspective view for explaining a method of attaching a second trim panel and a cut-off member.

Here, in the present embodiment, the vehicle 1 includes the first trim panel 6A having the air outlet port 61A and the second trim panel 7A not having an air outlet port depending on the application of the vehicle 1 as shown in FIG. 2A and FIG. 2B. Specifically, the first trim panel 6A and the second trim panel 7A can be selectively attached to the chassis 10 at the same position depending on the application of the vehicle 1.

Specifically, as shown in FIG. 2B, the second trim panel 7A includes a locking portion (not shown) that locks into a part of the chassis 10, like the first trim panel 6A. By allowing the locking portion to lock into the chassis 10, the second trim panel 7A can be attached to the chassis 10.

Further, as shown in FIG. 2B, the vehicle 1 includes the cut-off member 6 that blocks flow of the air in a portion where the blower fans 5A to 5E are removed in a state where the blower fan 5A is being detached from the pipe. In the present embodiment, since the socket 82 of the coupler 80 is attached to the end portion 32*a* of the secondary pipe 32A, the cut-off member 6 is a sealing plug coupled to the socket 82 in the present embodiment.

However, the configuration of the cut-off member 6 is not particularly limited as long as the flow of the air discharged from the end portion 32*a* can be blocked. For example, the cut-off member 6 may be a cover that is screwed into the socket 82 so as to cover the socket 82, or may be an on-off valve for discharging air from the socket 82. Note that although the structure of the second trim panel 7A disposed instead of the first trim panel 6A and the cut-off member 6 has been described referring to FIG. 2B, since the structure of the second trim panels 7B to 7E disposed instead of the first trim panels 6B to 6E and the cut-off member 6 is the same, detailed description thereof will be omitted. Note that although FIG. 3A, FIG. 4A, and the like do not show second trim panels disposed instead of the first trim panels 6D, 6E, the following may formally describe the second trim panels disposed instead of the first trim panels 6D, 6E as the second trim panels 7D, 7E.

Referring to FIG. 1A and FIG. 1B, the vehicle 1 in the first application, which is for a shuttle bus (for transporting passengers), will be described. In the case of the first application, couches (seats) 91 are arranged in the cabin. The blower fans 5A to 5E are attached to the chassis 10 together with the first trim panels 6A to 6E. In addition, as shown in FIG. 1A, trim panels 41 to 43, 7, and the like are attached to the chassis 10.

In this way, as shown in FIG. 1A, the air from the air conditioner 4 can be supplied to the blower fans 5A to 5E via the pipe 3. The air supplied to the blower fans 5A to 5E is stably supplied to the vehicle interior 13 via the air outlet ports 61A to 61E of the first trim panels 6A to 6E by driving the blower fans 5A to 5E.

Figure 3B:
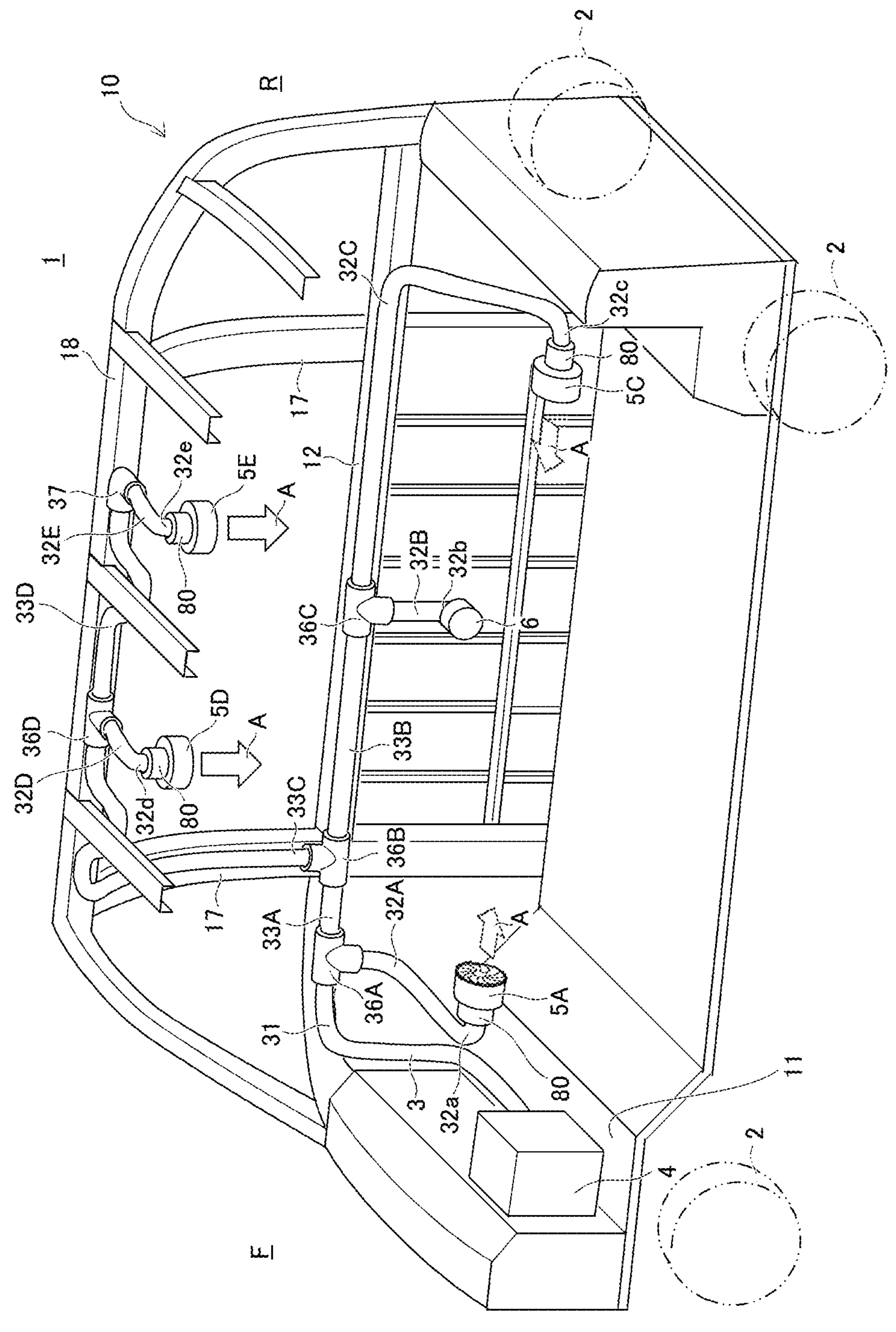
FIG. 3B is a schematic perspective view showing the position of a portion of a chassis, a pipe, and a blower fan of the vehicle in the second application in FIG. 3A.

In addition, the change from the first application shown in FIG. 1A and FIG. 1B to the second application for a mobile cafe as shown in FIG. 3A and FIG. 3B will be described. In this case, as shown in FIG. 3A, the lateral-side blower fan 5B connected to the coupler 80 is detached from the lateral-side secondary pipe 32B together with the first trim panel 6B. When the first trim panel 6B is detached from the chassis 10, the end portion 32*b* of the secondary pipe 32B is open. Therefore, the cut-off member 6 is attached to the socket 82 attached to the end portion 32*b* of the secondary pipe 32B. In addition, the second trim panel 7B is attached to the chassis 10 at the position where the first trim panel 6B was located. As a result, the air discharged from the secondary pipe 32B is shut off. In addition, the trim panels 41 to 43, 7, and the like having surfaces that match the interior of the vehicle interior 13 are attached to the chassis 10 of FIG. 3B. Further, the couches (seats) 91 are removed, and then round chairs 93, a beverage server 94, and tables 95 are attached.

In this way, as shown in FIG. 3A, the air from the air conditioner 4 can be supplied to the blower fans 5A, 5C to 5E except the blower fan 5B via the pipe 3. The air supplied to the blower fans 5A, 5C to 5E is stably supplied to the vehicle interior 13 via the air outlet ports 61A, 61C to 61E of the first trim panels 6A, 6C to 6E by driving the blower fans 5A, 5C to 5E.

Figure 4B:
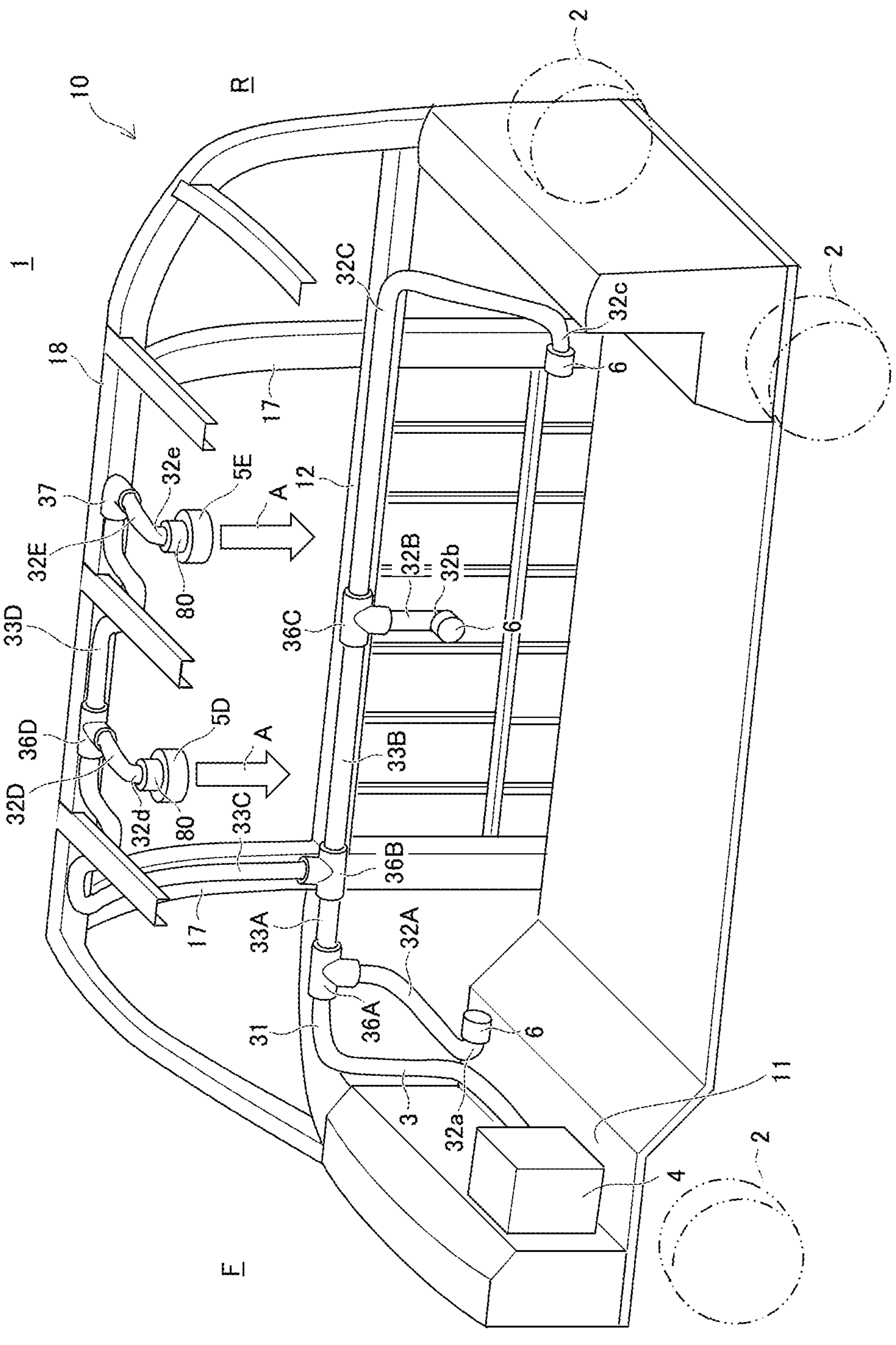
FIG. 4B is a schematic perspective view showing the position of a portion of a chassis, a pipe, and a blower fan of the vehicle in the third application in FIG. 4A.

In addition, the change from the second application shown in FIG. 3A and FIG. 3B to the third application for a mobile home delivery as shown in FIG. 4A and FIG. 4B will be described. In this case, the front-side blower fan 5A connected to the coupler 80 is detached from the front-side secondary pipe 32A together with the first trim panel 6A. Similarly, the rear-side blower fan 5C connected to the coupler 80 is detached from the rear-side secondary pipe 32C together with the first trim panel 6C. When the first trim panels 6A, 6C are detached from the chassis 10, the end portions 32*a*, 32*c* of the secondary pipes 32A, 32C are open. Therefore, the cut-off member 6 is attached to each of the sockets 82 attached to the end portions 32*a*, 32*c* of the secondary pipes 32A, 32C. In addition, the second trim panels 7A, 7C are attached to the chassis 10 at the positions where the first trim panels 6A, 6C were located. As a result, the air discharged from the secondary pipes 32A, 32C is shut off. The air from the secondary pipe 32B is continuously shut off. In addition, the trim panels 41 to 43, 7, and the like having surfaces that match the interior of the vehicle interior 13 are attached to the chassis 10 of FIG. 4B. Further, the round chairs 93, the beverage server 94, and the tables 95 are removed, and then a locker 96 is arranged.

In this way, as shown in FIG. 4A, the air from the air conditioner 4 can be supplied to the blower fans 5D, 5E disposed on the ceiling side via the pipe 3. The air supplied to the blower fans 5D, 5E is stably supplied to the vehicle interior 13 from the ceiling side through the air outlet ports 61D, 61E of the first trim panels 6D, 6E by driving the blower fans 5D, 5E.

According to the present embodiment, it is possible to divide the air A for air conditioning discharged by the air conditioner 4 in the pipe 3, allow the air A for conditioning to pass through each of the blower fans 5A to 5E from each of the end portions 32*a* to 32*e* of the pipe 3, and blow air from the air outlet ports 61A to 61E of the first trim panels 6A to 6E to the vehicle interior 13. In addition, the blower fan 5A for blowing air to the air outlet port 61A can be removed, and in the portion (socket 82) where the blower fan 5A or the like has been removed, the flow of air can be blocked by the cut-off member 6 for the air outlet port 61A or the like not required to blow air therefrom.

In this way, the air A for air conditioning can be selectively blown depending on the application of the vehicle interior 13. Here, when blowing the air A for air conditioning discharged by the air conditioner 4 is selected, the volume of the air to be blown varies. However, in the present embodiment, since the blower fans 5A to 5E are attached to the end portions 32*a* to 32*e* of the pipe 3, the air A in the volume corresponding to the performance of the blower fans 5A to 5E can be blown from each of the air outlet ports 61A to 61E to the vehicle interior 13.

The blower fans 5A to 5E are attached to the first trim panels 6A to 6E and are detachable from the chassis 10 together with the first trim panels 6A to 6E. Thus, the blower fans 5A to 5E can be detached from the chassis 10 integrally with the first trim panels 6A to 6E. Thus, since the positional relationship between the blower fans 5A to 5E and the air outlet ports 61A to 61E of the first trim panels 6A to 6E is fixed, it is possible to reduce the work of regulating the air direction of the blower fans 5A to 5E and the like. In addition, since the secondary pipes 32A to 32E in the portions connected to the blower fans 5A to 5E are made of a flexible hose, the blower fans 5A to 5E can be easily detached from the chassis 10 integrally with the first trim panels 6A to 6E.

In addition, according to the first to third applications, the first trim panels 6A to 6E having the air outlet ports 61A to 61E and the second trim panels 7A to 7E not having an air outlet port are provided. Thus, the first trim panels 6A to 6E or the second trim panels 7A to 7E can be selected and attached to the chassis 10 depending on the application of the vehicle. In particular, since the blower fans 5A to 5E are attached to the first trim panels 6A to 6E, it is possible to blow the air A for air conditioning from the air outlet ports 61A to 61E of the first trim panels 6A to 6E to a desired location.

Although the embodiment of the present disclosure has been described in detail above, the present disclosure is not limited to the above-described embodiment, and various design changes can be made without departing from the spirit of the present disclosure described in the claims.

In the present embodiment, although the positions and the number of blower fans and first trim panels have been specified as shown in FIG. 1A, the present disclosure is not limited to these positions and number, and it should be understood that the positions and the number are appropriately set depending on the application of the vehicle. Further, in the present embodiment, the first to third applications are shown as examples of the applications of the vehicle, but the application is not limited to these applications.

What is claimed is:

1. A vehicle in which air for air conditioning is blown from an air outlet port of a trim panel attached to a vehicle interior, the vehicle comprising:

an air conditioner configured to generate the air;

a pipe connected to the air conditioner and configured to divide the air discharged from the air conditioner into a plurality of flows;

a blower fan removably attached to each end portion of the pipe and configured to blow the divided air to the air outlet port; and a cut-off member configured to block flow of the air in a portion where the blower fan is removed in a state where the blower fan is being detached from the pipe, wherein the blower fan is configured to be attached to the trim panel and to be detachable from a chassis together with the trim panel, the trim panel includes a first trim panel having the air outlet port, and a second trim panel not having the air outlet port, and the first trim panel and the second trim panel are configured to be selectively attached to the chassis depending on an application of the vehicle.

2. The vehicle according to claim 1, wherein the pipe includes a plurality of portions, the plurality of portions including a portion connected to the blower fan, the portion connected to the blower fan being made of a flexible hose.

* * * * *